United States Patent
Rachid et al.

(10) Patent No.: US 12,537,590 B2
(45) Date of Patent: Jan. 27, 2026

(54) RELAY DEVICES FOR DISTRIBUTED NETWORKS

(71) Applicant: SILVUS TECHNOLOGIES, INC., Los Angeles, CA (US)

(72) Inventors: Mansour Rachid, Los Angeles, CA (US); Moein Sadeghi, Los Angeles, CA (US); Babak Daneshrad, Los Angeles, CA (US); Brett Walkenhorst, Los Angeles, CA (US); Eran Pisek, Los Angeles, CA (US)

(73) Assignee: Silvus Technologies, Inc., Los Angeles, CA (US)

( * ) Notice: Subject to any disclaimer, the term of this patent is extended or adjusted under 35 U.S.C. 154(b) by 643 days.

(21) Appl. No.: 17/659,314

(22) Filed: Apr. 14, 2022

(65) Prior Publication Data
US 2023/0033786 A1    Feb. 2, 2023

Related U.S. Application Data

(60) Provisional application No. 63/228,321, filed on Aug. 2, 2021.

(51) Int. Cl.
*H04B 7/00* (2006.01)
*H04B 7/155* (2006.01)
*H04L 25/02* (2006.01)

(52) U.S. Cl.
CPC ..... *H04B 7/15542* (2013.01); *H04L 25/0202* (2013.01)

(58) Field of Classification Search
None
See application file for complete search history.

(56) References Cited

U.S. PATENT DOCUMENTS

| 5,418,784 | A | 5/1995 | Ramakrishnan et al. |
| 5,436,903 | A | 7/1995 | Yang et al. |

(Continued)

FOREIGN PATENT DOCUMENTS

| CN | 303605235 | 3/2016 |
| CN | 303655182 | 4/2016 |

(Continued)

OTHER PUBLICATIONS

SC3500 Quick Start Guide CSMA, Doc. 10009C000 Version 1.2, dated May 10, 2012; 10 pages.

(Continued)

*Primary Examiner* — Gerald A Smarth
(74) *Attorney, Agent, or Firm* — Knobbe, Martens, Olson & Bear, LLP

(57) ABSTRACT

Systems and methods may include one or more devices associated with a relay network. In some examples, a relay device may be configured to determine, based at least partly on a control signal received from a destination device on a first carrier frequency, channel estimates for a channel between the relay device and the destination device. The device may determine, based at least partly on the channel estimates, a weighting function for transmissions from the relay device to the destination device. The device may generate baseband samples based on a down-conversion, from a second carrier frequency to a baseband frequency, of one or more incoming RF signals and apply the weighting function to the baseband samples to generate weighted baseband samples. The device may generate an outgoing RF signal based on an up-conversion of the weighted baseband samples from the baseband frequency to the first carrier frequency.

19 Claims, 9 Drawing Sheets

(56) References Cited

U.S. PATENT DOCUMENTS

| | | | |
|---|---|---|---|
| 6,038,225 A | 3/2000 | Nago | |
| 6,175,739 B1 | 1/2001 | Ishii et al. | |
| 6,219,053 B1 | 4/2001 | Tachibana | |
| 6,556,582 B1 | 4/2003 | Redi | |
| 6,754,176 B1 | 6/2004 | Gubbi et al. | |
| 6,760,371 B1 | 7/2004 | Bach | |
| 6,788,658 B1 | 9/2004 | Bims | |
| 6,980,561 B1 | 12/2005 | Abi-Nassif | |
| D590,410 S | 4/2009 | Wall | |
| D638,024 S | 5/2011 | Wall | |
| 8,107,966 B2 | 1/2012 | Choi et al. | |
| 8,160,090 B2 | 4/2012 | Yoshizawa et al. | |
| 8,462,709 B2 | 6/2013 | Nanda et al. | |
| 8,483,620 B2 | 7/2013 | Horn et al. | |
| 8,537,730 B2 | 9/2013 | Liu et al. | |
| D692,451 S | 10/2013 | Pearcy | |
| 8,588,091 B2 | 11/2013 | Trainin | |
| D708,193 S | 7/2014 | Agnew | |
| D710,863 S | 8/2014 | Agnew | |
| 8,837,435 B2 | 9/2014 | Singh et al. | |
| 8,861,445 B2 | 10/2014 | Jing et al. | |
| 8,873,470 B2 | 10/2014 | Cordeiro et al. | |
| 8,879,573 B2 | 11/2014 | Bahl et al. | |
| 8,913,597 B2 | 12/2014 | Benveniste | |
| 9,014,207 B2 | 4/2015 | Goel et al. | |
| 9,094,986 B2 | 7/2015 | Horn et al. | |
| 9,173,235 B2 | 10/2015 | Lim et al. | |
| 9,258,195 B1 | 2/2016 | Pendleton | |
| 9,407,298 B1 | 8/2016 | Hwang et al. | |
| 9,445,278 B2 * | 9/2016 | Sadek | H04W 16/14 |
| 9,503,286 B2 * | 11/2016 | Han | H04L 5/0048 |
| D775,196 S | 12/2016 | Huang | |
| D781,302 S | 3/2017 | Baguley | |
| D789,416 S | 6/2017 | Baluja | |
| D812,634 S | 3/2018 | Tuthill | |
| D824,922 S | 8/2018 | McGovern | |
| D841,671 S | 2/2019 | Clavin | |
| D859,433 S | 9/2019 | Kim | |
| D867,389 S | 11/2019 | Jamison | |
| D886,834 S | 6/2020 | Chitalia | |
| 10,728,121 B1 | 7/2020 | Chitalia | |
| D908,137 S | 1/2021 | Varghese et al. | |
| D916,828 S | 4/2021 | Daie | |
| D936,697 S | 11/2021 | Hosokuni | |
| 11,188,445 B2 | 11/2021 | Knowles et al. | |
| 11,226,126 B2 | 1/2022 | Przybylski et al. | |
| 11,226,975 B2 | 1/2022 | Patthak et al. | |
| 11,258,807 B2 | 2/2022 | Muddu et al. | |
| 11,290,348 B1 | 3/2022 | Margaria et al. | |
| D947,890 S | 4/2022 | Yamasaki | |
| 11,294,789 B2 | 4/2022 | Knowles et al. | |
| 11,340,931 B2 | 5/2022 | Krishna et al. | |
| 11,381,285 B1 * | 7/2022 | Shattil | H04B 1/0003 |
| 11,463,325 B2 | 10/2022 | D'Ippolito | |
| D968,425 S | 11/2022 | Bhardwaj | |
| 11,507,262 B2 | 11/2022 | Campbell | |
| D982,021 S | 3/2023 | Daneshvar et al. | |
| 11,706,099 B2 | 7/2023 | Chitalia | |
| 11,743,135 B2 | 8/2023 | Mordani | |
| 11,963,026 B2 | 4/2024 | Daneshvar et al. | |
| D1,030,790 S | 6/2024 | Seo | |
| 12,058,015 B2 | 8/2024 | Erickson | |
| 12,144,011 B2 | 11/2024 | Zhu et al. | |
| 12,166,516 B2 | 12/2024 | Rachid | |
| 2004/0071154 A1 | 4/2004 | Wentink | |
| 2004/0146022 A1 | 7/2004 | Lewis et al. | |
| 2004/0240426 A1 | 12/2004 | Wu et al. | |
| 2005/0169185 A1 | 8/2005 | Qiu | |
| 2007/0177520 A1 | 8/2007 | Morinaga et al. | |
| 2008/0052378 A1 | 2/2008 | Matsuyama | |
| 2008/0052379 A1 | 2/2008 | Matsuyama | |
| 2009/0262688 A1 | 10/2009 | Tsai et al. | |
| 2010/0074141 A1 | 3/2010 | Nguyen | |
| 2010/0075704 A1 | 3/2010 | McHenry et al. | |
| 2010/0165899 A1 | 7/2010 | Van Bosch et al. | |
| 2011/0314145 A1 | 12/2011 | Raleigh et al. | |
| 2012/0082040 A1 | 4/2012 | Gong et al. | |
| 2012/0327870 A1 | 12/2012 | Grandhi et al. | |
| 2013/0058222 A1 | 3/2013 | Ben Yehezkel et al. | |
| 2013/0163575 A1 | 6/2013 | Pak et al. | |
| 2013/0201857 A1 | 8/2013 | Bhargava et al. | |
| 2013/0311832 A1 | 11/2013 | Lad | |
| 2014/0050203 A1 | 2/2014 | Doppler et al. | |
| 2014/0066050 A1 | 3/2014 | Kotecha et al. | |
| 2014/0079016 A1 | 3/2014 | Dai et al. | |
| 2014/0092877 A1 | 4/2014 | Kazmi et al. | |
| 2014/0094130 A1 | 4/2014 | Elenes et al. | |
| 2014/0169290 A1 | 6/2014 | Seok | |
| 2014/0307639 A1 | 10/2014 | Jung et al. | |
| 2014/0328265 A1 | 11/2014 | Sampath et al. | |
| 2015/0113118 A1 | 4/2015 | Jain | |
| 2015/0245282 A1 | 8/2015 | Kim et al. | |
| 2015/0264689 A1 | 9/2015 | Sampath et al. | |
| 2015/0333933 A1 | 11/2015 | Lopez de Victoria | |
| 2016/0050683 A1 | 2/2016 | Gupta et al. | |
| 2016/0294650 A1 | 10/2016 | Padhye | |
| 2016/0337094 A1 | 11/2016 | Andreoli-Fang et al. | |
| 2017/0026270 A1 | 1/2017 | Handige Shankar | |
| 2017/0085334 A1 | 3/2017 | Ishioka | |
| 2017/0310552 A1 | 10/2017 | Wallerstein | |
| 2017/0357389 A1 | 12/2017 | Fleizach et al. | |
| 2018/0136798 A1 | 5/2018 | Aggour | |
| 2019/0053293 A1 | 2/2019 | Akoum et al. | |
| 2019/0116504 A1 | 4/2019 | Rusackas | |
| 2019/0174383 A1 | 6/2019 | Zhang et al. | |
| 2019/0281507 A1 | 9/2019 | Rahat et al. | |
| 2019/0320462 A1 | 10/2019 | Li et al. | |
| 2020/0007405 A1 | 1/2020 | Chitalia | |
| 2020/0067952 A1 | 2/2020 | Deaguero | |
| 2020/0084759 A1 | 3/2020 | Liu et al. | |
| 2020/0403881 A1 | 12/2020 | DeLuca | |
| 2021/0026677 A1 | 1/2021 | Krishna | |
| 2021/0028962 A1 | 1/2021 | Schelstraete et al. | |
| 2021/0028996 A1 | 1/2021 | Mordani | |
| 2021/0153089 A1 | 5/2021 | Nayak et al. | |
| 2021/0258029 A1 | 8/2021 | Cyzs | |
| 2021/0297868 A1 | 9/2021 | Beck et al. | |
| 2021/0314112 A1 * | 10/2021 | Balasubramanian | H04L 5/0076 |
| 2021/0320678 A1 * | 10/2021 | Luo | G06N 3/08 |
| 2022/0385547 A1 | 12/2022 | Daneshvar et al. | |

FOREIGN PATENT DOCUMENTS

| | | | |
|---|---|---|---|
| CN | 305391642 | 10/2019 | |
| EP | 2088811 A1 | 8/2009 | |
| EP | 1603283 B1 | 9/2010 | |
| EP | 2744292 A1 | 6/2014 | |
| EP | 2866514 A2 | 4/2015 | |
| KR | 2006010018 A | 2/2006 | |
| WO | WO 2005039105 A1 | 4/2005 | |
| WO | WO 2006106459 A1 | 10/2006 | |
| WO | WO 2007098136 A2 | 8/2007 | |
| WO | WO 2011129634 A3 | 1/2012 | |
| WO | WO 2014124131 A2 | 8/2014 | |
| WO | WO-2019006730 A1 * | 1/2019 | H04B 7/088 |
| WO | WO-2020020283 A1 * | 1/2020 | H04W 72/0473 |

OTHER PUBLICATIONS

SteamCaster MIMO Radio User Manual, Doc. 10017C000 Version 3.12, dated Jun. 2, 2015; 70 pages.

SteamCaster MIMO Radio User Manual, Doc. 10017C000 Version 3.12.5, dated Oct. 7, 2016; 92 pages.

SteamCaster MIMO Radio User Manual, Doc. 10017C000 Version 3.15.0.3, dated Sep. 4, 2018; 146 pages.

SteamCaster MIMO Radio User Manual, Doc. 10017C000 Version 3.15.0.4, dated Oct. 23, 2018; 134 pages.

SteamCaster MIMO Radio User Manual, Doc. 10017C000 Version 3.15.0.5, dated Dec. 19, 2018; 137 pages.

SteamCaster MIMO Radio User Manual, Doc. 10017C000 Version 3.17.0.5, dated Apr. 30, 2019; 158 pages.

(56) References Cited

OTHER PUBLICATIONS

Boksiner, et al., "Centrally Controlled Dynamic Spectrum Access for MANETs" 2013 IEEE Military Communications Conference, IEEE Computer Society, 978-0-7695-5124, pp. 641-646, Milcom, Jan. 2013.
Jones et al., "A Dynamic Spectrum Access Mac Applique for Legacy Military Radios" The John Hopkins University Applied Physics Laboratory, 978-1-4244-2677, pp. 1-5, Milcom, May 2008.
Kumar et al., "Medium Access Control Protocol for Ad-Hoc Wireless Networks: A Survey" Electrical and Computer Engineering Department, Clarkson University, Embedded Software for Digital Televisions Group, ATI Research, and Department of Computer Science, University of New Orleans, pp. 1-54, 2004.
Marinho et al., "Cognitive Radio: Survey on Communication Protocols, Spectrum Decision Issues, and Future Research Directions" Wireless Netw, vol. 18, pp. 147-164, 2012.
Nasipuri, et al., "Performance of Multichannel Wireless Ad Hoc Networks" Int. J. Wireless and Mobile Computing, vol. 1, Nos. ¾, pp. 191-203, 2006.
Park et al., Performance of Joint Spectrum Sensing and MAC Algorithms for Multichannel Opportunistic Spectrum Access Ad Hoc Networks, IEEE Transactions on Mobile Computing, vol. 10, No. 7, pp. 1011-1027, Jul. 2011.
Perich et al., "Efficient Dynamic Spectrum Access Implementation" The 2010 Military Communications Conference—Unclassified Program—Networking Protocols and Performance Track, 978-1-4244-8180, pp. 1887-1892, Apr. 2010.
Redi, et al., "The DARPA WNaN Network Architecture" The 2011 Military Communications Conference—Track 6—Department of Defense Programs, 978-1-4673-0081, pp. 2258-2263, 2011.
Seelig, et al. "A Description of the Aug. 2006 XG Demonstrations at Fort A. P. Hill" U.S. Department of Defense Advanced Research Projects Agency, 1-4244-0663, pp. 1-12, Mar. 2007.
Shiang et al., "Distributed Resource Management in Multihop Cognitive Radio Networks for Delay-Sensitive Transmission" IEEE Transactions on Vehicular Techonology, vol. 58, No. 2, pp. 941-953, Feb. 2009.
Ye, et al., "An Energy-Efficient MAC Protocol for Wireless Sensor Networks" Information Science Institute, University of Southern California Computer Science Department, 2011.
Yucek et al., "A Survey of Spectrum Sensing Alforithms for Cognitive Radio Applications" IEEE Communications Surveys & Tutorials, vol. 11, No. 1, pp. 116-130, 2009.
Zhao et al., "A Survey of Dynamic Spectrum Access" IEEE Signal Processing Magazine 1053-5888, pp. 79-89, May 2007.
Zhao et al., "Decentralized Cognitive MAC for Opportunistic Spectrum Access in Ad Hoc Networks: A POMDP Framework" IEEE Journal on Selected Areas in Communications, vol. 25, No. 3, pp. 589-600, Apr. 2007.
The Mac Level (link layer), downloaded on Dec. 7, 2015 from website: http://www.labs.hpe.com/personal/Jean_Tourrilhes/Linux/Linux.Wireless.mac.html, 2000.
Chevillat, et al., "Dynamic Data Rate and Transmit Power Adjustment in IEEE 802.11 Wireless LANs," Int J Wireless Inf Networks 12, 123-145 (2005).
Holland, et al., "A Rate-Adaptive MAC Protocol for Multi-Hop Wireless Networks," In Proceedings of the 7th annual international conference on Mobile computing and networking (MobiCom '01). Association for Computing Machinery, New York, NY, USA, 236-251.
Qiao, et al., "Goodput enhancement of IEEE 802.11a wireless LAN via link adaptation," ICC 2001. IEEE International Conference on Communications. Conference Record (Cat. No. 01CH37240), Helsinki, Finland, pp. 1995-2000 vol. 7, 2001.
Baivector. "Structure molecule and communication." Shutterstock, published Jan. 8, 2018 (Retrieved from the Internet May 21, 2025). Internet URL: <https://www.shutterstock.com/image-vector/structure-molecule-communication-dna-atom-neurons-790269595>.
Sunward Art. "Social media communication digital concept." Shutterstock, published Jul. 14, 2019 (Retrieved from the Internet May 21, 2025). Internet URL: <https://www.shutterstock.com/image-vector/social-media-communication-digital-concept-network-1451764961>.

\* cited by examiner

RELAY DEVICES FOR DISTRIBUTED NETWORKS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD OF THE DISCLOSURE

The subject matter disclosed herein relates to the field of relay communication and distributed networks.

BACKGROUND

Possible goals of systems that employ relay communication and/or distributed networks may include range extension, anti-jam capability, low probability of intercept (LPI) capability, low probability of detection (LDP) capability, and others. Potential challenges to achieving such goals may include jamming, terrain, obstacles in the environment, network congestion, and others. Accordingly, techniques which address these and other challenges may be beneficial.

SUMMARY

In one aspect, a relay device, the relay device configured to determine, based at least partly on a control signal received from a destination device on a first carrier frequency, channel estimates for a channel between the relay device and the destination device, determine, based at least partly on the channel estimates for the channel between the relay device and the destination device, a weighting function for transmissions from the relay device to the destination device, where the weighting function is based on a frequency-dependent phase or a frequency-dependent gain, generate baseband samples based on a down-conversion, from a second carrier frequency to a baseband frequency, of one or more incoming RF signals received from one or more source devices on the second carrier frequency, apply the weighting function to the baseband samples to generate weighted baseband samples, generate, for transmission on the first carrier frequency to the destination device, an outgoing RF signal based on an up-conversion of the weighted baseband samples from the baseband frequency to the first carrier frequency.

The relay device may also include where the relay device determines the channel estimates based on a correlation operation between the control signal and a predetermined channel estimation sequence.

The relay device may also include where the relay device decodes at least a portion of the control signal to generate one or more information fields; and determines the channel estimates based on at least one of the information fields.

The relay device may also include where the one or more incoming RF signals includes an aggregate channel includes RF signals from multiple source devices received in time resources that overlap.

The relay device may also include where the channel estimates are first channel estimates, the time resources are first time resources, and the relay device is further configured to determine second channel estimates based on an aggregate control signal from the source devices received in second time resources that overlap, and determine the weighting function further based on the second channel estimates.

The relay device may also include where the relay device is further configured to determine the weighting function based at least partly on complex conjugates of the second channel estimates.

The relay device may also include where the baseband samples are first baseband samples, generate second baseband samples based on another down-conversion, from the first carrier frequency to the baseband frequency, of another RF signal received from the destination device on the first carrier frequency, generate, for transmission on the second carrier frequency to the source devices, another outgoing RF signal based on another up-conversion of the second baseband samples from the baseband frequency to the second carrier frequency.

The relay device may also include where the one or more incoming RF signals includes at least a first RF signal from a first source device and a second RF signal from a second source device, the first and second RF signals received at the relay device in overlapping time resources.

The relay device may also include where the relay device is configured to apply the weighting function in the time domain.

The relay device may also include where the relay device is configured to apply the weighting function in the frequency domain.

The relay device may also include where the relay device determines the weighting function to enable transmit beamforming to the destination device.

The relay device may also include where the relay device is part of a cluster of relay devices, the relay device is configured to receive, from the destination device, an error signal that indicates a difference between an aggregate channel of the relay devices received at the destination device, and an expected signal received at the destination device. The relay device may also include determine the weighting function based at least partly on the error signal, to enable beamnulling at the destination device.

The relay device may also include where the weighting function includes a plurality of filter weights, and the relay device determines the weighting function based at least partly on one or more of the filter weights using an adaptive algorithm.

The relay device may also include where the relay device operates in a group of distributed relay devices for relay of signals from the source devices to the destination device.

The relay device may also include where the relay device operates in a group of distributed relay devices for distributed relay of signals from the source devices to the destination device, where the relay device determines the weighting function to enable distributed transmit beamforming to the destination device.

The relay device may also include where the relay device is configurable to generate the weighted baseband samples without decoding of the baseband samples.

The relay device may also include where the relay device is configurable to generate the weighted baseband samples without decoding of the baseband samples. Other technical features may be readily apparent to one skilled in the art from the following figures, descriptions, and claims.

In one aspect, a relay device, configured to Determine an aggregate channel estimate based at least partly on an aggregate control signal received on a first carrier frequency, where the aggregate control signal includes a plurality of control signals from a plurality of source devices in first overlapping time resources, Determine a weighting function based at least partly on the aggregate channel estimate, where the weighting function is based on a frequency-dependent phase or a frequency-dependent gain, Generate baseband samples based on a down-conversion, from the first carrier frequency to a baseband frequency, of an aggregate data signal received from the plurality of source devices on the first carrier frequency in second overlapping time resources, Apply the weighting function to the baseband samples to generate weighted baseband samples, Generate, for transmission on a second carrier frequency to a destination device, an outgoing RF signal based on an up-conversion of the weighted baseband samples from the baseband frequency to the second carrier frequency.

The relay device may also include where the relay device determines the channel estimates based on a correlation operation between the aggregate control signal and a predetermined channel estimation sequence.

The relay device may also include where the relay device is further configured to determine, based at least partly on a control signal received from the destination device on the second carrier frequency, channel estimates for a channel between the relay device and the destination device, determine the weighting function further based at least partly on the channel estimates.

The relay device may also include the relay device operates in a group of distributed relay devices for relay of signals from the plurality of source devices to the destination device. Other technical features may be readily apparent to one skilled in the art from the following figures, descriptions, and claims.

In one aspect, a master device, configured to generate, for broadcast transmission, one or more pilot signals to enable training of one or more slave devices for aggregate transmissions, by the slave devices to a controller device, generate baseband samples based on a down-conversion, from a first carrier frequency to a baseband frequency, of an aggregate data signal received from the slave devices, where the aggregate data signal includes a preamble portion based on a predetermined preamble sequence, and further includes a data portion, determine an equalizer based on a comparison between the predetermined preamble sequence and the preamble portion of the aggregate data signal, apply the equalizer to the data portion of the aggregate data signal to generate equalized data samples.

The master device may also include where the master device is part of a relay network for relay of a data signal from an originating device through one or more relay stages to a destination device.

The master device may also include where the aggregate data signal is received on the first carrier frequency, the master device further configured to generate, for relay to a destination device on a second carrier frequency, an RF signal based on an up-conversion of the equalized data samples to the second carrier frequency.

The master device may also include where the master device further configured to generate the equalized data samples for relay to a destination device on an RF cable coupled to the master device. Other technical features may be readily apparent to one skilled in the art from the following figures, descriptions, and claims.

The relay device may also include where the relay device is configured to apply the weighting function using an FIR filter.

The master device may also include where when the master device operates as the destination device, the master device is configured to determine the equalizer based on a composite channel response between the originating device and the master device.

The master device may also include where the baseband samples are first baseband samples, the data portion is a first data portion, the RF signal is a first RF signal, the master device is further configured to generate second baseband samples based on the down-conversion, from the second carrier frequency to the baseband frequency, of a second RF signal from the destination device, where the second RF signal includes a second data portion to be relayed from the destination device to the slave devices, and generate, for transmission to the slave devices on the first carrier frequency, a second RF signal based on an up-conversion of the second baseband samples to the second carrier frequency. Other technical features may be readily apparent to one skilled in the art from the following figures, descriptions, and claims.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Relay networks include wireless networks where a source device and destination device communicate by means of relay devices or nodes. In many relay networks, relay devices receive digital traffic from the source device and perform a process of decoding and reencoding the traffic before sending it to the destination device. In an NxM network, this process can involve significant computational processing and a fairly complex system for coordination of devices. Disclosed herein are systems and methods to reduce the complexity and computational processing required of relay networks.

Potential benefits of the subject matter disclosed herein includes, but are not limited to: aggregate channel estimation in an NxM network and relay of baseband (I/Q) samples without decoding. For example, a relay device may form an aggregate channel estimation wherein each device forms a channel estimation between itself and another device in the network, which can be simpler and less complex than channel estimation based on full channel state information (CSI). In another example, a relay network using systems and methods described herein may provide a bandwidth efficiency advantage over techniques in which traffic received at relay devices (such as I/Q samples) is converted into bits (such as with a pulse-code modulation or PCM-type of encoding) before being transmitted to a destination device.

A. Example Networking Device

Figure 1:
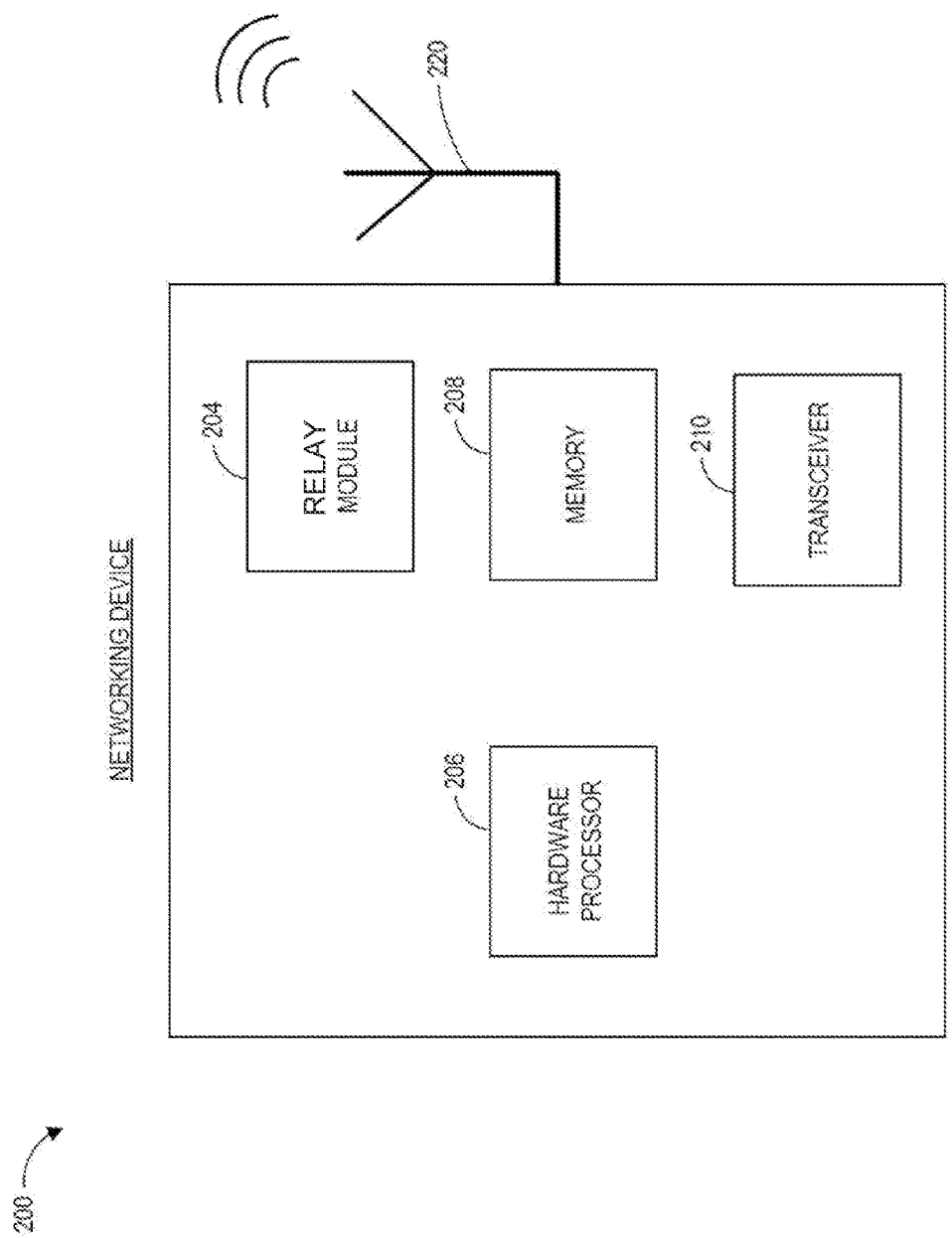
FIG. 1 illustrates an example networking device that may be part of a relay network described herein.

FIG. 1 illustrates an embodiment of a networking device 200 including a transceiver 210 and an antenna 220. The networking device 200 can form one of the nodes of network, such as discussed herein, including but not limited to a relay device, source device, destination device, master device, slave device, and/or other device. In some embodiments, the networking device 200 can also be a part of a network that includes a centralized hub. The networking device 200 may include legacy radio devices. In some embodiments, the networking device 200 is a Rifleman Radio. In other embodiments, the networking device 200 is a radio that implements one or more of the Institute of Electrical and Electronics Engineers' (IEEE) 802.11 standards, such as, for example a "Wi-Fi" radio. A networking device that implements one or more such IEEE 802.11 standards will be referred to herein as a radio, system, protocol, or technology that has "WiFi." The networking device 200 can include a radio that uses Soldier Radio Waveform (SRW).

The networking device 200 includes a transceiver 210 for transmitting and/or receiving signals. In some embodiments, the networking device 200 can include more than one transceiver (not shown). For example, the networking device 200 may have separate transceivers for receiving and transmitting signals. In some embodiments, the networking device 200 can be a MIMO networking device or other networking device.

The networking device 200 can include hardware and/or software modules. In the illustrated embodiment, the networking device 200 includes a hardware processor 206 and a memory 208. Further, the networking device 200 includes a relay module 204. The relay module 204 may be implemented in hardware or software or a combination of both. In some embodiments, the hardware processor 206 may execute the relay module 204. Further, in some embodiments, the memory 208 can include instructions corresponding to relay and communication. For example, the memory 208 can store commands for operation of the networking device 200, such commands may include commands to change its channel, sense interference, broadcast the interference matrix. The memory 208 can also store channel lookup matrix with the corresponding states of the respective channel. For instance, the memory 208 can store the detected interference in different channels for each of the nodes of the network. The networking device 200 may also include additional modules not shown in the illustrated embodiment. For example, the networking device 200 may include a power source such as a battery.

The relay module 204 can implement one or more relay or other communication protocols disclosed herein to facilitate communicate between network devices over a shared medium. As discussed, instructions for executing the protocols of the relay module 204 can be stored in a memory 208 of a networking device 200. Accordingly, in some instances, the power control engine 202 can enable adaptive power control in legacy network devices through software or a firmware update.

B. Example Relay Networks

Example relay networks that may apply systems and methods described herein are shown in FIGS. 2-6, but it is understood that embodiments are not limited to the examples shown or described. In some embodiments, one or more methods, operations, or techniques may be performed by an element (such as a device, node, or other) of a relay network. However, the scope of embodiments is not limited in this respect. Although a relay network may be included in descriptions of some of the methods, operations, techniques, and concepts herein, the scope of embodiments is not limited in this respect.

Accordingly, one or more of the methods, operations, techniques, and concepts described herein may be used in embodiments, scenarios, and cases that may not necessarily include relay networks or elements of relay networks (like relay devices, source devices, destination devices, master devices, slave devices, or other). In some embodiments, a device that may not necessarily be part of a network may perform one or more of the methods, operations, and/or techniques described herein. It is also understood that some embodiments may include additional devices than are shown in FIGS. 2-6.

Figure 2:
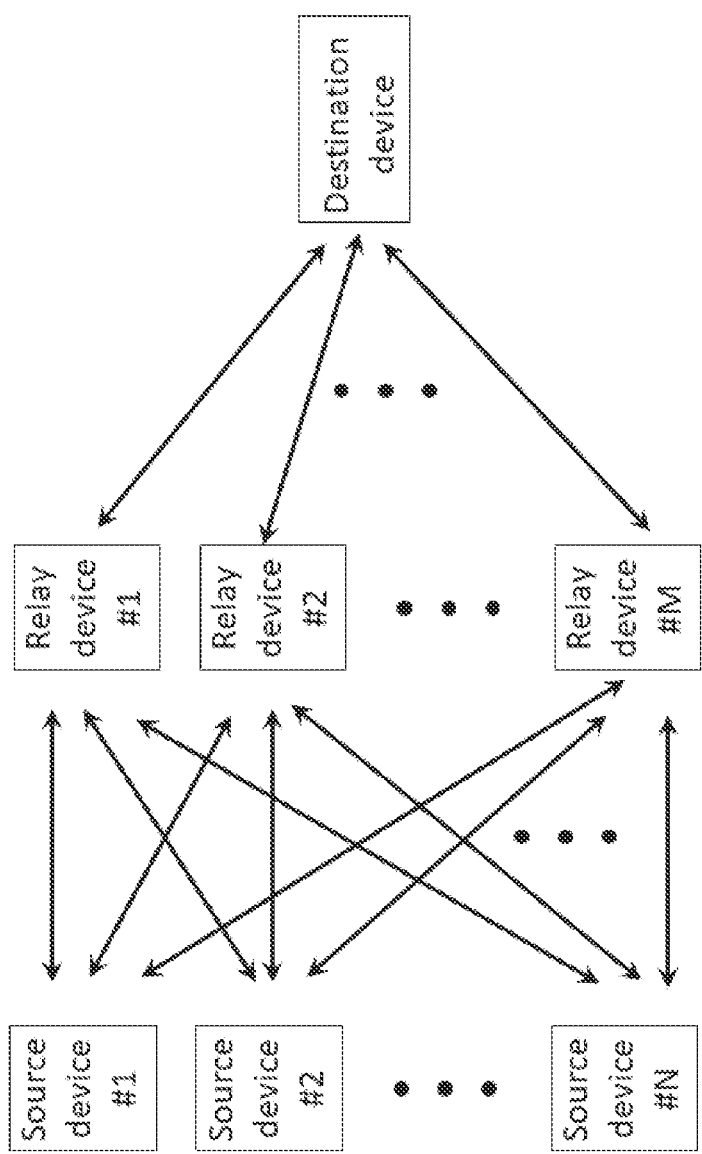
FIG. 2 illustrates an example relay network of the described system.

In a first example network, such as shown in FIG. 2, one or more source devices may communicate with one or more relay devices. Multiple relay devices may additionally or alternatively communicate with a destination device.

Figure 3:
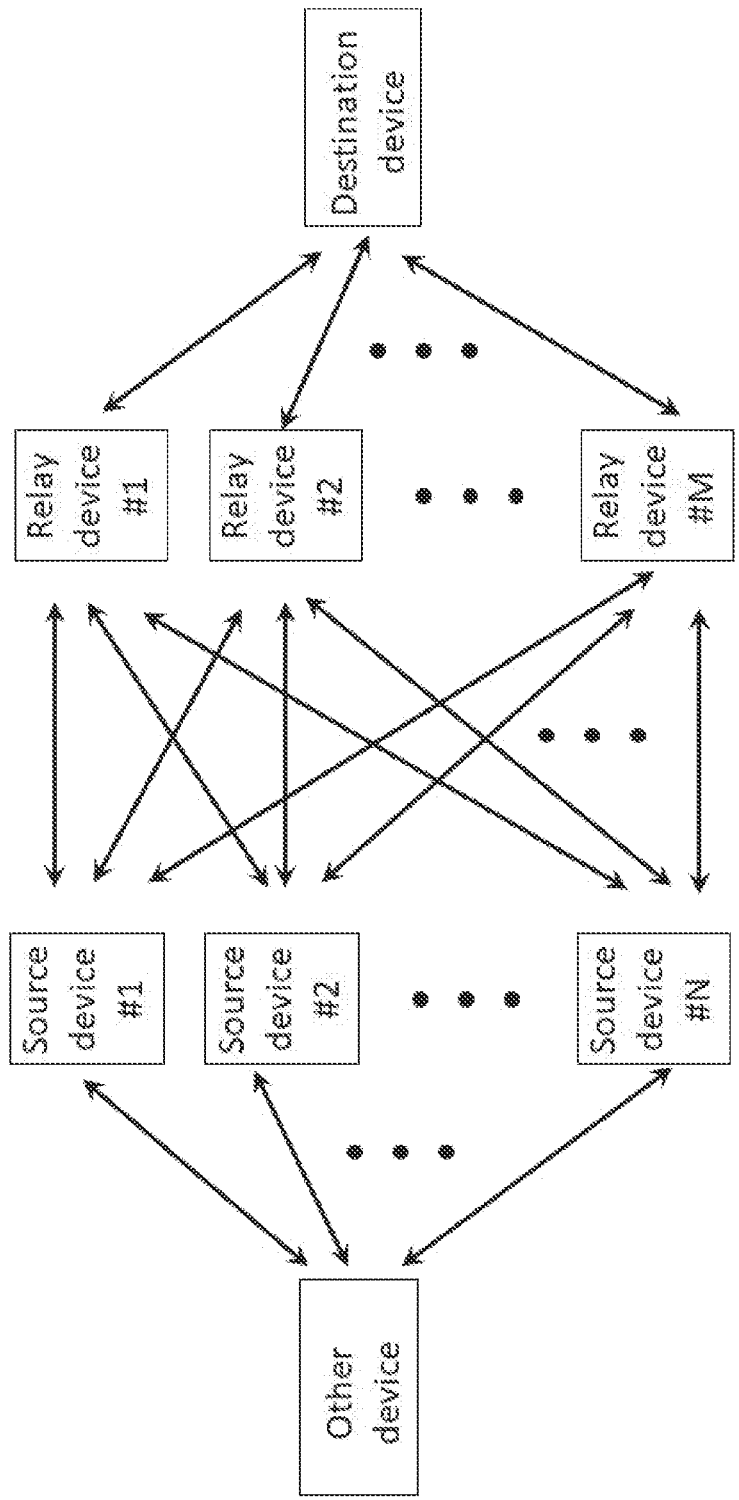
FIG. 3 illustrates another example relay network of the described system.

In a second example network, such as shown in FIG. 3, a relay network is configured to enable long range communication between a destination device and an "other device". In the illustrated example, one or more other devices may communicate with one or more source devices. The one or more source devices may communicate with the one or more relay devices. Multiple relay devices may additionally or alternatively communicate with the destination device.

Figure 4:
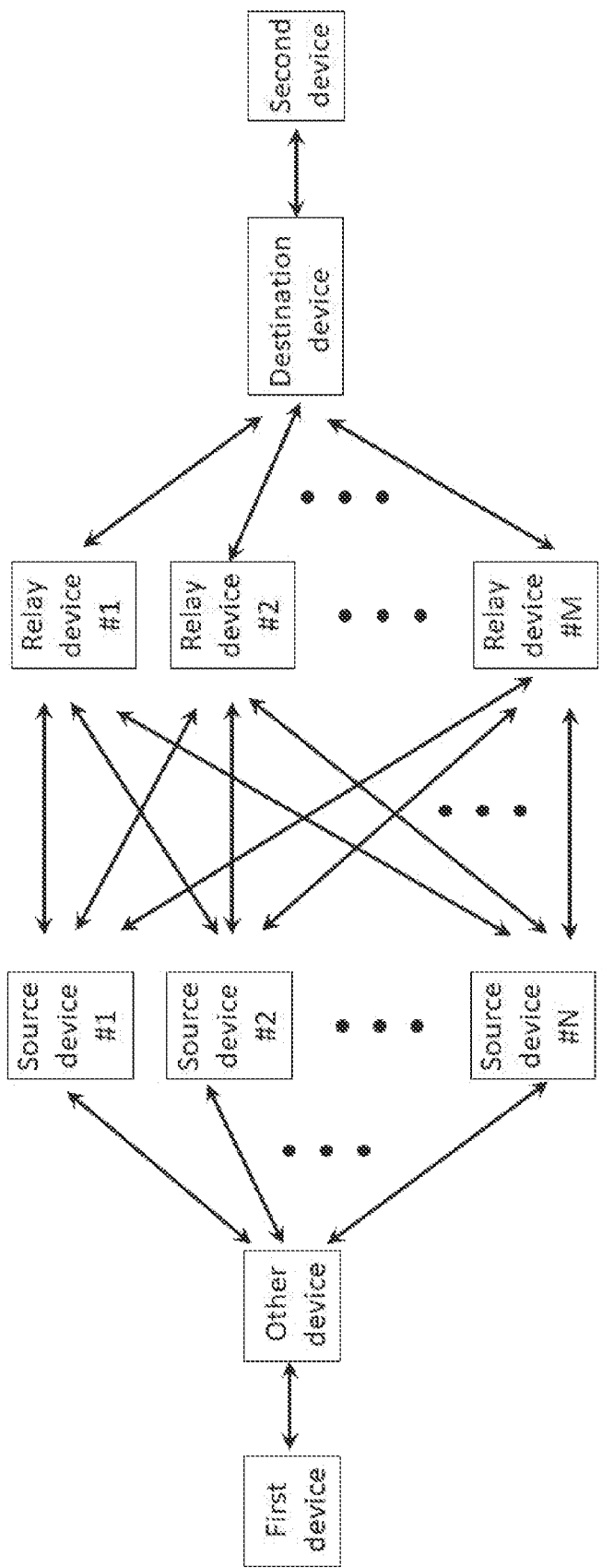
FIG. 4 illustrates another example relay network of the described system.

In a third example network, such as shown in FIG. 4, a relay network is configured to enable communication between a first device and a second device. In the illustrated example, one or more first devices may communicate with the one or more other devices, such as shown in FIG. 3. The one or more other devices may communicate with the one or more source devices. The one or more source devices may communicate with the one or more relay devices. Multiple relay devices may additionally or alternatively communicate with the destination device. The destination device may communication with one or more second devices.

Figure 5:
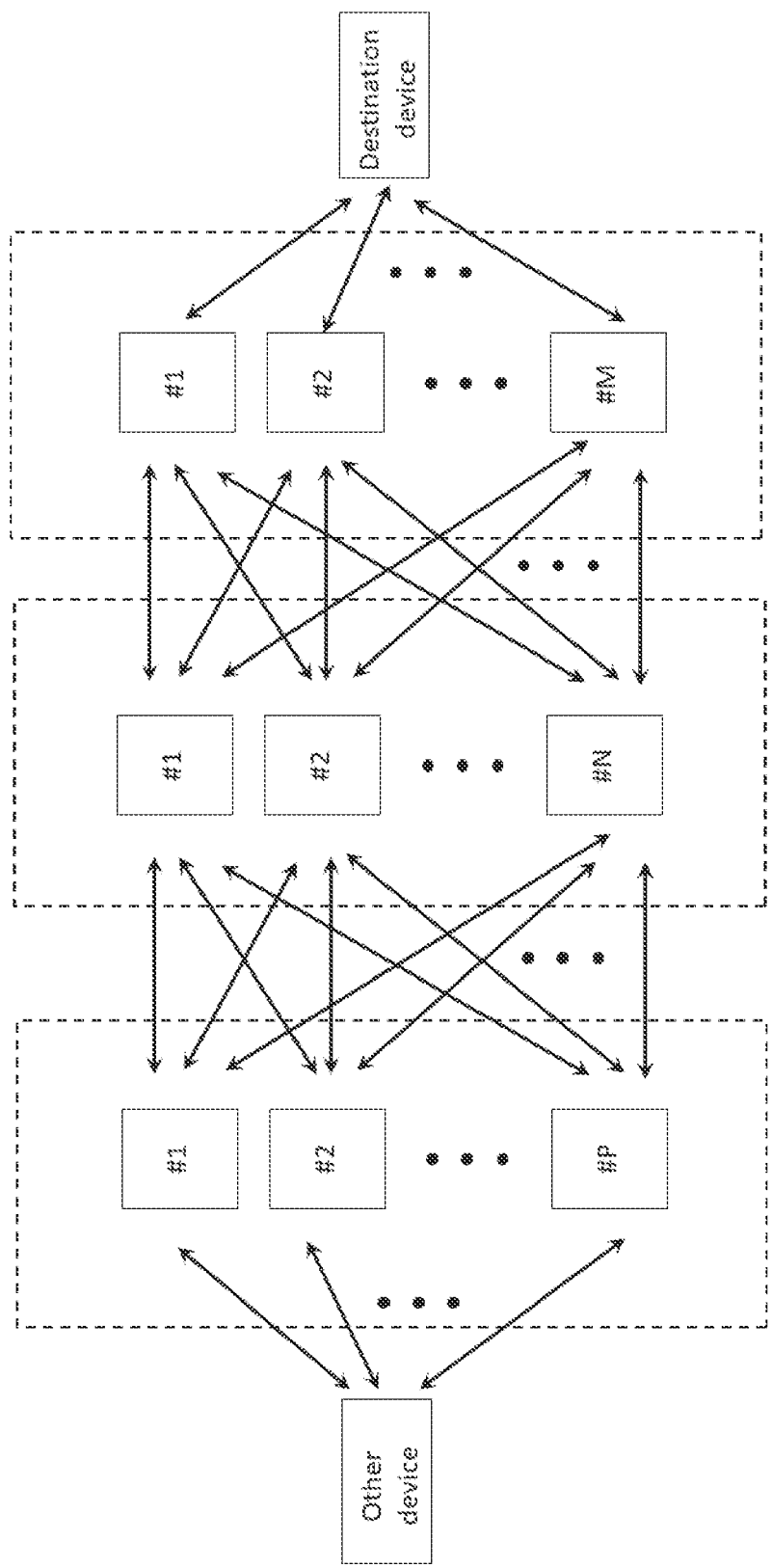
FIG. 5 illustrates another example relay network of the described system.

In a fourth example network, such as shown in FIG. 5, a relay network may have multiple stages of relay devices (which may also be referred to as clusters) involved in a relay communication between a destination device and an "other device." In the illustrated example, one or more other devices may communicate with one or more of a first set of P relay devices. The first set of P relay devices may communicate with one or more of a second set of N relay devices. The second set of N relay devices may communicate with one or more of a set of M relay devices. The relay devices may additionally or alternatively communicate with the destination device.

Figure 6:
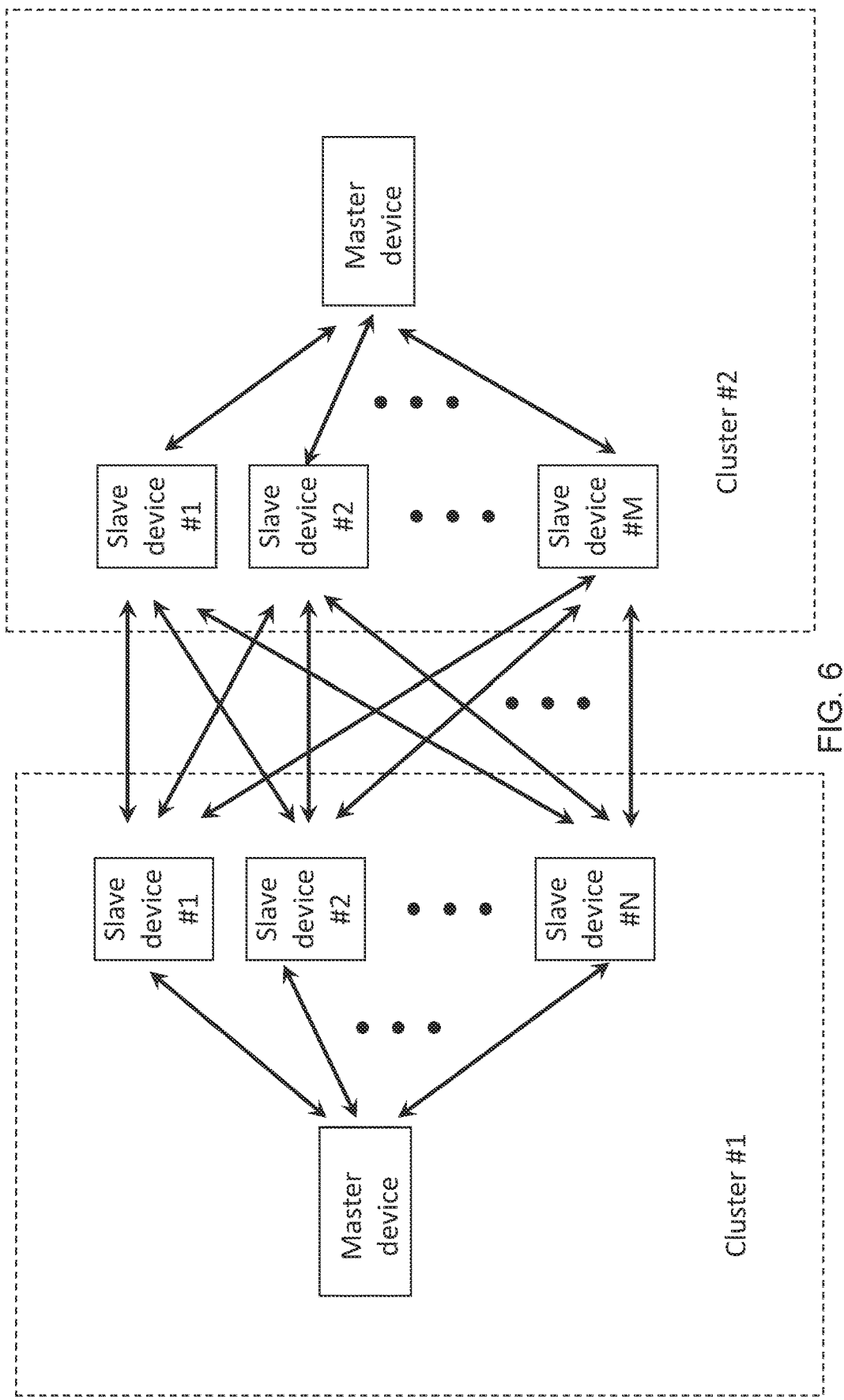
FIG. 6 illustrates another example relay network of the described system.

In a fifth example network, such as shown in FIG. 6, a relay network may have clusters of devices configured to communicate. In the illustrated example, each of a first and a second cluster may include a master device and one or more slave devices. The master device of each cluster may be configured to communicate with the one or more slave devices. The one or more slave devices may of a first cluster may be configured to communicate with one or more slave devices of a second cluster. Accordingly, communication between the master device of the first cluster and the master device of the second cluster may be facilitated through the communication of their slave devices. Some examples may include more than one relay stages and/or more than two clusters.

In some embodiments, one or more of the relay networks described herein (including but not limited to those in the figures) may enable one or more of the following, although the scope of embodiments is not limited in this respect—long-range communication; increase in range; range extension; gain in received signal-to-noise ratio (SNR), signal quality, signal level, or other metric; and/or increase in capacity, throughput, or other metric.

It is understood that embodiments are not limited to the number of devices shown in the example networks illustrated FIGS. 2 to 6. In some embodiments, one or more of the stages or clusters shown with multiple devices in FIGS. 2 to 6 may include a single device. While reference may be made to example networks described herein, it is understood that alternate configurations are also possible. Embodiments are not limited to the communication possibilities shown in the example networks in FIGS. 2 to 6. For instance, in FIG. 2, communication is illustrated between the source devices and the relay devices, and between the relay devices and the destination device. In some embodiments, communication between the source devices and the destination device may also be possible. Such flexibility is also extended to the other example networks in FIGS. 3 to 6, wherein communication between devices may be possible although not illustrated, in some embodiments.

It should be noted that the direction of communication between components in the example networks described herein may be uni-directional or bi-directional. For instance, although an example network may be described in terms of communication in a single direction, it is understood that bi-directional communication is also possible in some embodiments. As an example, in FIG. 2, the source devices may transmit signals to the relay device(s) for relay to the destination device, but it is understood that the relay devices may also transmit signals to the source devices for any purpose, including but not limited to: a) relay to one or more other devices (such as in FIG. 3, FIG. 4 or other), b) usage by the source devices, c) other.

In some embodiments, a device may operate (at least in some capacity) as a "controller" of a cluster. As a controller, the device may perform operations related to control of other devices (such as relay devices or other). In some embodiments, a device may operate (at least in some capacity) as a "master device." As a master device, the device may perform operations related to control of other devices (such as relay devices, slave devices, or other). The master device may also participate in other operations in addition to control-related operations, such as relay, reception of signals, usage of data content, or other.

In some embodiments, one or more devices may belong to a cluster. In some embodiments, one or more of the devices may be distributed geographically within the cluster, and therefore separated from other devices (such as other relay devices, controller device, master device, or other). In some embodiments, one or more of the devices may not necessarily be distributed geographically. In some embodiments, one or more devices (such as a relay device or other) may be co-located with another device (such as the master device, destination device, controller device, relay device, or other).

In some embodiments, there may be some individual communication and/or coordination between relay devices of a cluster. In some embodiments, such individual communication is limited, non-existent, or impossible. For example, the relay devices of a cluster may operate in accordance with ad-hoc principles, and may communicate with a master device, destination device, or other, while generally not communicating or coordinating with other relay devices of the cluster.

For instance, in the example relay network illustrated in FIG. 3, communication may include broadcast of a waveform by the "other device," followed by reception and relay by the source devices, without coordination/scheduling between the source devices. On the other side, the relay devices may also operate without coordination/scheduling amongst themselves, performing one or more of the following: 1) each relay device receives an aggregated signal from the source devices, 2) all (or at least some) of the relay devices transmit their aggregated signals to the destination device in a near-simultaneous manner. It is noted that, in some cases, not all of the relay devices necessarily perform these operations. For instance, there are cases in which a relay device does not successfully receive an indication that a relay is being performed. In such cases, the relay device may not necessarily attempt to receive the aggregate channels from the source devices or to transmit corresponding signals (as a relay) to the destination device, although one or more of the other relay devices may perform those operations.

Embodiments are not limited in terms of the signal that is relayed. For instance, the relay signal may be a control signal, a data signal, or a combination thereof. The signal may originate at one of the devices shown in the example networks in FIGS. 2 to 6. The signal may originate outside of a network in some embodiments (for instance, one of the networks shown in FIGS. 2 to 6 may relay a signal from a device not shown).

Referring to FIG. 2, in the example network shown, the channels between source devices and the relay devices will be denoted as $b_{m,n}$ (between the nth source device and the mth relay device). It is understood that the $b_{m,n}$ may be single channel coefficients (such as may be seen in a line-of-sight (LOS) scenario), multiple coefficients spaced in time (such as may be seen in a multi-path scenario), a time function, or any suitable representation. In some embodiments, the channel from the nth source device to the mth relay device may be reciprocal to, the same as, or similar to the channel from the mth relay device to the nth source device, although the scope of embodiments is not limited in this respect.

In some embodiments, a device (relay device, source device, destination device, or other) may perform channel estimation to determine one or more of the channels described above. In some embodiments, a device (relay device, source device, destination device, or other) may perform aggregate channel estimation based on a superposition of signals. In some embodiments, one or more devices may scale signals by weighting function(s) that may be based on one or more of the channels or channel estimates described above.

In some embodiments, RF signals may include signals (like data, control, or other, or a combination thereof) that are not necessarily decoded by a device that receives the signals. For instance, in-phase (I) and quadrature (Q) samples of a baseband signal may be weighted and transmitted. In an example, the weights may be based on conjugates of channel coefficients and/or channel estimates. These coefficients may be estimated by devices using aggregate over-the-air channel probes (such as aggregate channel estimation or standard channel estimation, described below. In some embodiments, a network (including but not limited to those described in FIGS. 2 to 6 and elsewhere herein) may effectively act as a high gain antenna on a signal transmitted by a first device and received at a second device after passing through the network.

C. Example Relay Device Process

In some embodiments, one or more of the following may be performed at one of the devices described herein. It is noted that the devices may not necessarily perform all of the operations below, in some embodiments.

Figure 7:
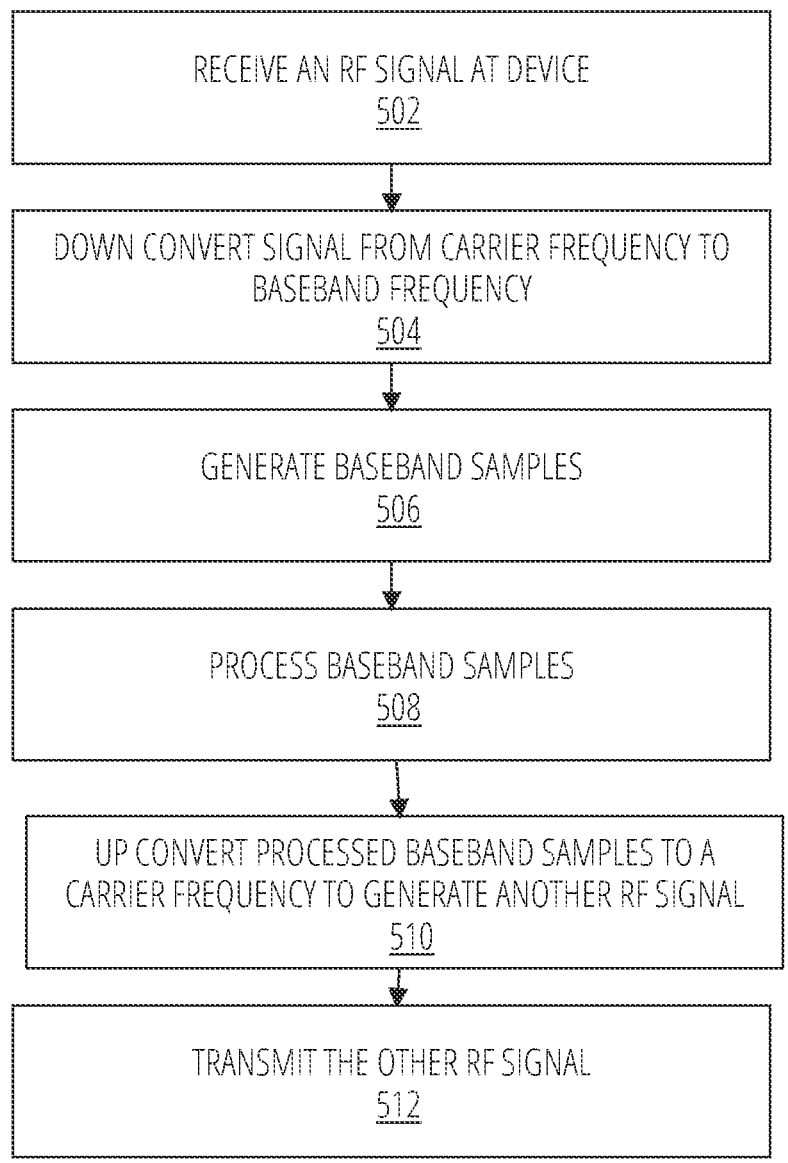
FIG. 7 illustrates an aspect of the subject matter in accordance with one embodiment.

FIG. 7 illustrates an example process that may be performed by one or more systems described herein. The process described herein may advantageously provide a bandwidth efficiency advantage over techniques in which traffic received at relay devices (such as I/Q samples) is converted into bits (such as with a pulse-code modulation or PCM-type of encoding) before being transmitted to a destination device.

As illustrated in FIG. 7, a signal may be received at a device at a block 502. The received signal may include any number of types of signals. For example, signals may include but are not limited to: an RF signal received wirelessly at a carrier frequency, a signal received over a cable at a carrier frequency, and/or a signal received over a cable at baseband frequency. The receiving device may include, for example, a relay device, source device, or slave device, such as described with reference to FIGS. 2-6. In some examples, more than one device may receive the signal. The transmitting device may include, for example include a source device, a different relay device, or another device configured to transmit a signal to a source, relay, or other device. In some examples, a transmitting device may include a master device configured to transmit the signal to a slave device.

At a block 504, the signal may be down-converted from the carrier frequency to baseband. In some examples, the signal may additionally or alternatively be converted to an intermediate frequency (IF). In some examples, the device receiving the signal at block 502 may be configured to down-covert the signal. In some examples, the signal may be down-converted to a frequency associated with relay devices in the relay network. For example, in the event of multiple relay stages in the relay network, the receiving device may be configured to down-covert the signal to a frequency associated with a next stage of relay devices in the relay network.

At a block 506, baseband samples of the signal may be generated using an analog-to-digital converter (ADC). In some examples, direct conversion of the RF signal to baseband samples is also possible, wherein baseband samples are generated by sampling an RF signal. In some examples, the device receiving the signal at block 502 may be configured to generate the baseband samples. The baseband signal may additionally or alternatively be processed by other devices in the relay network to generate baseband samples. The baseband samples may then be transmitted by the receiving device to a secondary device, such as another relay device in the relay network.

At a block 508, the baseband samples may be processed using one or more operations such as weighting, processing with a weighting function, precoding, beamforming, time-compression, pilot-insertion, and/or other(s). In some examples, the baseband samples may be processed by the device that receives the baseband samples, such as a secondary relay device that received the baseband samples from a first relay device. In some examples, the baseband samples may be processed by the device receiving the signal at block 502. The baseband samples may additionally or alternatively be processed by other devices in the relay network.

At a block 510, the processed baseband samples may be up-converted to a carrier frequency (may be a different frequency than the one in which the signal is received in some embodiments, or may be the same frequency in some embodiments) to generate another RF signal. In some embodiments, a digital-to-analog converted (DAC) may be used to convert the processed baseband samples into an analog signal, which may be up-converted to the carrier frequency. In some examples, the processed baseband samples may be up-converted by the device that processes the baseband samples, such as a secondary relay device that received the baseband samples from a first relay device. The baseband samples may additionally or alternatively be processed by other devices in the relay network. The up-converted baseband samples or RF signal may then be transmitted by the receiving device to a secondary device, such as another relay device in the relay network, a destination device and/or another device in the relay network at block 512.

At a block 512, the other RF signal may be transmitted to one or more relay devices, to one or more source devices, to one or more destination devices, or to one or more other devices over a cable or wirelessly. The other RF signal may be sent wirelessly in some embodiments. The other RF signal may be sent over a cable in some embodiments. In some embodiments, the processed baseband samples may be sent to another device at baseband (such as without conversion to a carrier frequency).

In some embodiments, the baseband samples may not be decoded, and thus not converted into bits (such as may occur with PCM-type encoding). In some embodiments, the baseband samples generated by the ADC (or otherwise) may be up-converted with little or no processing to an RF signal and transmitted.

In some embodiments, the baseband samples may be processed using one or more operations like equalization, removal of pilots (or other overhead), time-expansion, and/or other(s). Digital to Analog conversion (DAC) may be used to convert the processed baseband samples or the baseband samples into an analog waveform (which may be up-converted and/or transmitted).

D. Example Channel Estimation

In some embodiments, aggregate channel state information (CSI) may be determined instead of full CSI. The use of aggregate CSI may enable ad-hoc distributed operation of the network and/or a simpler system design. Details of aggregate channel estimation are described herein. A relay device may form an aggregate channel estimation wherein each device forms a channel estimation between itself and another device in the network, which can be simpler and less complex than channel estimation based on full channel state information (CSI).

In some embodiments, "aggregate channel estimation" in multiple-to-multiple or multiple-to-single types of scenarios may be used. Aggregate channel estimation may be used in scenarios other than the examples that follow. In a non-limiting example, one or more relay devices may perform aggregate channel estimation on signals received from multiple sources devices. In a non-limiting example, one or more destination device may perform aggregate channel estimation on signals received from multiple relay devices.

It should be noted that the aggregate channel estimation is applicable in scenarios in which multiple signals are received near-simultaneously at a device. So channel estimation used in a one-to-many device scenario (such as in transmission from a destination device to multiple relay devices) may not necessarily be considered aggregate channel estimation, but may be referred to as "standard channel estimation." Accordingly, in some embodiments standard channel estimation may be used in scenarios in which a signal is received from one device (and not multiple devices). The algorithms for aggregate channel estimation and standard channel estimation may be different, in some embodiments. The algorithms for aggregate channel estimation and standard channel estimation may be similar in some embodiments.

To illustrate aggregate channel estimation first between multiple source devices and multiple relay devices, consider a relay communication between a transmitting cluster of N source devices and a receiving cluster of M relay devices. The matrix B (of dimension M×N) characterizes the channels, with element bmn assigned to the channel between the nth source device and the mth relay device.

The aggregate channel estimation at each relay device may be found by forming a single CSI measurement on an incoming aggregate channel that includes pilots from the N source devices superimposed on each other in time and frequency (the source devices may transmit pilots at approximately the same time). In the absence of noise, and in an Line-of-Sight (LOS) channel, the aggregate CSI estimate at the mth relay device may be:

$$CSI(mth \text{ relay device}) = \sum_{n=1}^{N} b_{m,n}$$

It is noteworthy that for this technique, the mth relay device needs to know little (or nothing) about the source devices or about the other relay devices. Some information that may not be necessary includes, but is not limited or restricted to, location, distance, and identity. In fact, the relay device does not even need to know how many source devices are present or how many other relay devices are present. These characteristics may be part of ad-hoc operation, in some cases.

In contrast to the usage of aggregate CSI, measurement of the full CSI typically would user a large amount of inter-cluster coordination between the source devices and the relay devices. For example, scheduling of individual pilot transmissions from the source devices would likely need to be performed in order to obtain full CSI. Thus, there can be significant challenges in protocol complexity and scalability in a scheme that attempts to use full CSI.

On the link between relay devices and the destination device, the destination device may perform aggregate channel estimation that is similar to the procedure described above, although the scope of embodiments is not limited in this respect. If the channel between the nth relay device and the destination device is denoted as an. Consider the communication from a transmitting cluster of N relay devices to the destination device, the aggregate CSI at the destination device may be:

$$CSI(\text{desitnation device}) = \sum_{n=1}^{N} a_n$$

Different methods of channel estimation are possible. It is possible that a similar method may be used for aggregate and standard channel estimation, although the scope of embodiments are not limited in this respect. In some embodiments, the aggregate and standard channel estimation may use different methods.

E. Channel Estimation in Time Domain or Frequency Domain

Figure 8:
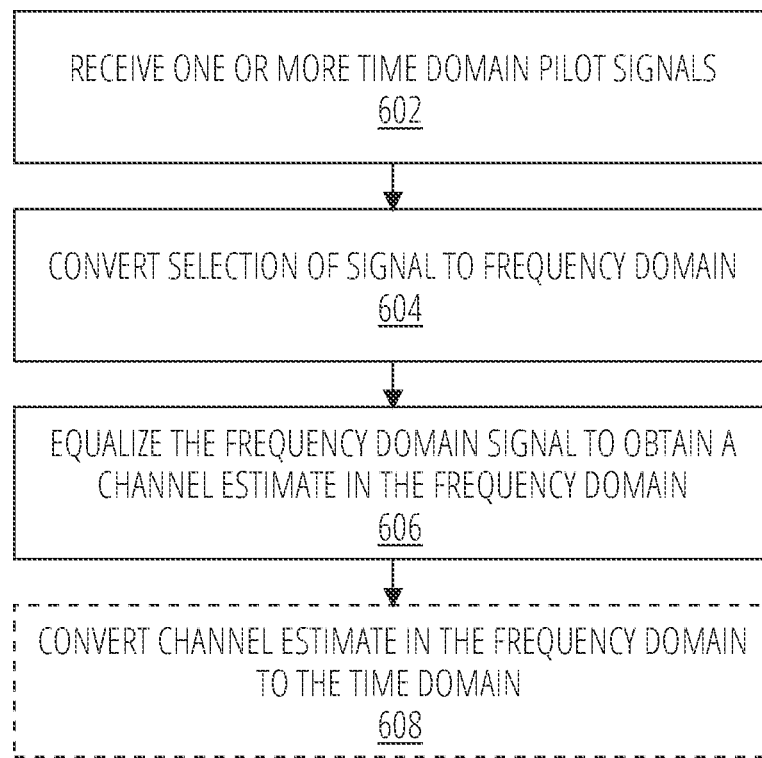
FIG. 8 illustrates an aspect of the subject matter in accordance with one embodiment.

In some embodiments, channel estimation may be based on orthogonal frequency division multiplexing (OFDM) signals. A non-limiting example channel estimation technique is illustrated in FIG. 8.

In a block 602, a time domain pilot signal may be received and/or known by both sides of a channel, such as a receiving device and a transmitting device. The receiving device and/or transmitting device may be any set of devices configured to communicate a signal in the relay network, such as the example networks illustrated in FIGS. 2-6 and described above. The time domain pilot signal may be based on mapping of a known pilot sequence to frequency units. The frequency units may be associated with subcarriers, subchannels, spectrum, or other division of frequency resources. The mapping may be transformed to the time domain using a suitable technique such as an inverse discrete Fourier transform (DFT) and/or a fast Fourier transform (FFT).

In a block 604, at the receiver, a section of a signal received by the receiving device and/or transmitting device may be selected and converted to the frequency domain via a suitable frequency transform, such as DFT and/or FFT. The receiving device and/or transmitting device may be configured to perform the selection and/or conversion. The received signal may include any number of types of signals. For example, signals may include but are not limited to: an RF signal received wirelessly at a carrier frequency, a signal received over a cable at a carrier frequency, and/or a signal received over a cable at baseband frequency.

In a block 606, the frequency domain version of the received signal may equalized using the known pilot sequence to obtain a channel estimate in the frequency domain. The receiving device and/or transmitting device may be configured to equalize the known pilot sequence and/or obtain the channel estimate.

At an optional block 608, the channel estimate in the frequency domain can be converted to the time domain, to enable usage of a time-domain filter for equalization. The receiving device and/or transmitting device may be configured to convert the channel estimate to the time domain. The channel estimate may be converted to the time domain using a suitable technique, such as an inverse DFT and/or FFT.

Figure 9:
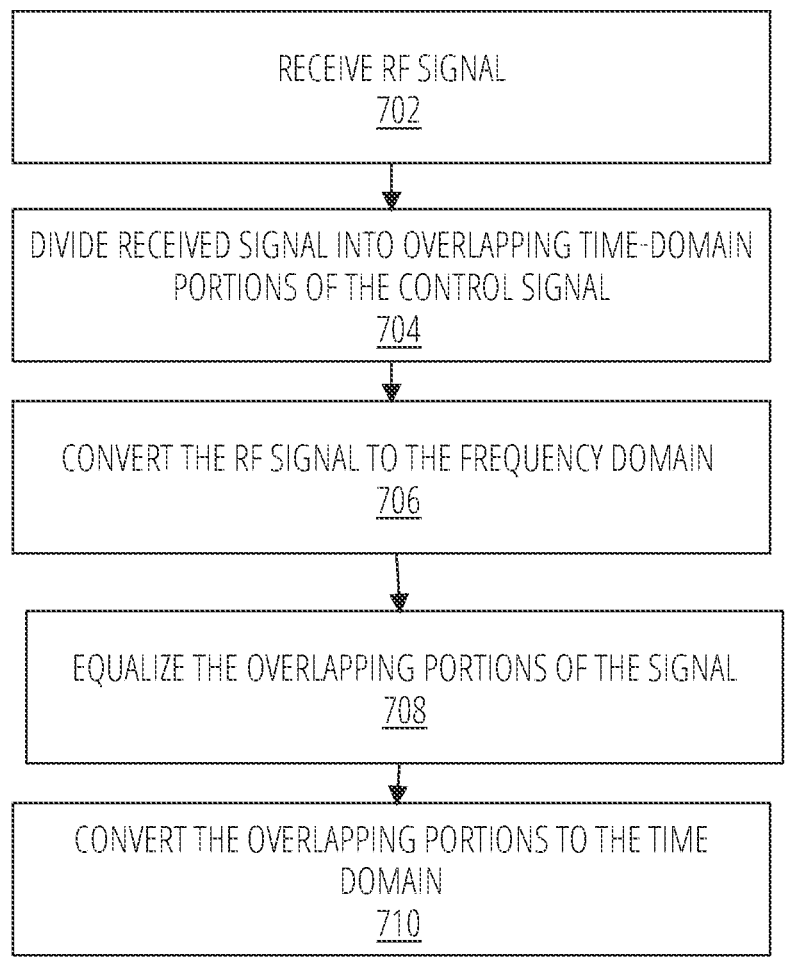
FIG. 9 illustrates an aspect of the subject matter in accordance with one embodiment.

A process, such as illustrated in FIG. 8, may include one or more other or additional operations. In some embodiments, channel estimation may use overlap-add concepts. FIG. 9 illustrates a non-limiting example channel estimation technique. As illustrated in FIG. 9, an example channel estimation technique may include: receiving an RF signal at a block 702, dividing the received signal into overlapping time-domain portions in a block 704, converting the overlapping portions to the frequency domain (along with windowing) at a block 706, equalizing the overlapping portions of the signal at a block 708, converting the overlapping portions of the signal to the time domain (along with windowing) at a block 710. The process may additionally determine an FIR filter that can be used for equalization.

One or more or other operations may be additionally or alternatively be implemented.

F. Transmit Beamforming

In some embodiments, one or more devices in the relay network, such as a relay device may use transmit beamforming as part of a process of transmitting a signal from a source or other device to a destination or other device. In some embodiments, a weighting function may be determined by one or more of a relay device or other device in the relay network to enable transmit beamforming.

In some embodiments, transmit beamforming may be used by multiple devices as part of transmission to a single device (such as from multiple relay devices to the destination device, or other scenarios). In some embodiments, transmit beamforming may be used by multiple devices as part of transmission to multiple devices (such as from multiple source devices to multiple relay devices, or other scenarios). In some embodiments, multiple instances of transmit beamforming may be performed in the network. In a non-limiting example (including but not limited to the example illustrated in FIG. 4), the source devices may receive a signal from another device and may perform transmit beamforming when they relay the signal to the relay devices. The relay devices may perform transmit beamforming when they relay the signal to the destination device.

A potential goal of transmit beamforming is to enable phase coherency. For example, in the transmission from the relay devices to the destination device, when relay devices transmit the same signal (or similar signal), transmit beamforming may be used by the relay devices to enable the signals from the relay devices to arrive phase coherently at the destination device. Similarly, in the relay from the source devices to the relay devices, when the source devices transmit the same signal (or similar signal), transmit beamforming may be used by the source devices to enable the signals from the source devices to arrive (at least somewhat) phase coherently at the relay devices.

Another potential goal of transmit beamforming is to pre-process the signals before transmission, such that the received signals at a destination (like another device) add constructively instead of destructively.

In some embodiments, transmit beamforming may be performed by pre-multiplication/pre-filtering of the transmitted signal, which can be done in the time domain or the frequency domain. For a frequency domain beamformer, the transmitted signal is converted to the frequency domain, processed by the beamformer, and converted back to the time domain. For a time domain beamformer, the transmitted signal is filtered in the time domain by a beamforming filter.

Any number of weights and/or taps may be used in the transmit beamformer, including just one weight and/or tap. For example, a single weight in frequency and/or a single tap will result in a transmit beamformer that just pre-multiplies the transmitted signal. But with multiple weights and/or taps, the transmit beamformer can modify the frequency response of the transmitted signal. For example, a goal may be to better match the frequency response of the transmitted signal with that of the channel (for flatness, SNR gain, or other purpose).

In some embodiments, the amplitude and phase may both be modified by the transmit beamforming. For instance, if the channel attenuates one particular frequency range, the transmit beamformer may effectively adjust its power distribution to give a boost to the transmitted signal in that frequency range.

In phase-only beamforming, the transmitted signal is pre-processed (in the time or frequency domain) by one or more phasors (complex values with varying phase, amplitude of 1.0).

G. Beamnulling

In some embodiments, one or more devices in the relay network, such as a relay device may use beamnulling may be used part of a process of transmitting a signal from a source or other device to a destination or other device. In a non-limiting example, beamnulling may be used by the relay devices as part of transmission to the destination device. In another non-limiting example, beamnulling may be used by the source devices as part of transmission to the relay devices.

In some embodiments, one or more devices may use transmit beamforming and beamnulling, although the scope of embodiments is not limited in this respect. Referring back to FIG. 2, in an example of beamnulling, the relay devices may transmit a predetermined signal (such as pilot sequences or other) to the destination device in the same (or at least overlapping) time resources. The destination device may determine an error signal based on a comparison between an aggregate channel (formed by the relay devices transmitting the predetermined signal) and an expected signal. The error signal may provide information about interference signal(s) that are received at one or more relay devices, and subsequently relayed to the destination device (along with the predetermined signal). The destination device may broadcast the error signal. The relay devices may update their weighting functions, beamnullers, precoders, or other based on the error signal. For instance, an adaptive algorithm, such as least mean squares (LMS) or other, may be used in some embodiments. The scope of embodiments is not limited in this respect, however, as any type of algorithm or any type of adaptive algorithm may be used. In some cases, the precoder described above may perform beamnuller operations. It is noted that embodiments are not limited by the above example of beamnulling from the relay devices to the destination device.

H. Additional Examples

Disclosed herein are additional examples of systems and methods described herein. Any of the examples in this disclosure may be combined in whole or in part.

Example 1: A relay device, the relay device configured to: determine, based at least partly on a control signal received from a destination device on a first carrier frequency, channel estimates for a channel between the relay device and the destination device;

determine, based at least partly on the channel estimates for the channel between the relay device and the destination device, a weighting function for transmissions from the relay device to the destination device, wherein the weighting function is based on a frequency-dependent phase or a frequency-dependent gain;

generate baseband samples based on a down-conversion, from a second carrier frequency to a baseband frequency, of one or more incoming RF signals received from one or more source devices on the second carrier frequency;

apply the weighting function to the baseband samples to generate weighted baseband samples; and generate, for transmission on the first carrier frequency to the destination device, an outgoing RF signal based on an up-conversion of the weighted baseband samples from the baseband frequency to the first carrier frequency.

Example 2: The relay device of example 1, wherein the relay device is further configured to determine the channel estimates based on a correlation operation between the control signal and a predetermined channel estimation sequence.

Example 3: The relay device of example 1, wherein the relay device is further configured to: decode at least a portion of the control signal to generate one or more information fields; and determine the channel estimates based on at least one of the one or more information fields.

Example 4: The relay device of example 1, wherein the one or more incoming RF signals includes an aggregate channel comprising RF signals from multiple source devices received in time resources that overlap.

Example 5: The relay device of example 4, wherein the channel estimates are first channel estimates, the time resources are first time resources, and the relay device is further configured to:
determine second channel estimates based on an aggregate control signal from the multiple source devices received in second time resources that overlap, and
determine the weighting function further based on the second channel estimates.

Example 6: The relay device of example 5, wherein the relay device is further configured to determine the weighting function based at least partly on complex conjugates of the second channel estimates.

Example 7: The relay device of example 4, wherein the baseband samples are first baseband samples, wherein the relay device is further configured to:
generate second baseband samples based on another down-conversion, from the first carrier frequency to the baseband frequency, of another RF signal received from the destination device on the first carrier frequency;
generate, for transmission on the second carrier frequency to the multiple source devices, another outgoing RF signal based on another up-conversion of the second baseband samples from the baseband frequency to the second carrier frequency.

Example 8: The relay device of example 1, wherein the one or more incoming RF signals comprises at least a first RF signal from a first source device and a second RF signal from a second source device, the first and second RF signals received at the relay device in overlapping time resources.

Example 9: The relay device of example 1, wherein the relay device is configured to apply the weighting function in the time domain.

Example 10: The relay device of example 9, wherein the relay device is configured to apply the weighting function using an FIR filter.

Example 11: The relay device of example 1, wherein the relay device is configured to apply the weighting function in the frequency domain.

Example 12: The relay device of example 1, wherein the relay device is configured to determine the weighting function to enable transmit beamforming to the destination device.

Example 13: The relay device of example 1, wherein the relay device is part of a cluster of relay devices, the relay device is configured to:
receive, from the destination device, an error signal that indicates a difference between: an aggregate channel of the relay devices received at the destination device, and an expected signal received at the destination device; and
determine the weighting function based at least partly on the error signal, to enable beamnulling at the destination device.

Example 14: The relay device of example 1, wherein the weighting function includes a plurality of filter weights, and the relay device is further configured to determine the weighting function based at least partly on one or more of the filter weights using an adaptive algorithm.

Example 15: The relay device of example 1, wherein the relay device operates in a group of distributed relay devices for relay of signals from the source devices to the destination device.

Example 16: The relay device of example 1, wherein the relay device operates in a group of distributed relay devices for distributed relay of signals from the source devices to the destination device, wherein the relay device is further configured to determine the weighting function to enable distributed transmit beamforming to the destination device.

Example 17: The relay device of example 1, wherein the relay device is configurable to generate the weighted baseband samples without decoding of the baseband samples.

Example 18: A relay device, configured to:
determine an aggregate channel estimate based at least partly on an aggregate control signal received on a first carrier frequency,
wherein the aggregate control signal comprises a plurality of control signals from a plurality of source devices in first overlapping time resources;
determine a weighting function based at least partly on the aggregate channel estimate, wherein the weighting function is based on a frequency-dependent phase or a frequency-dependent gain;
generate baseband samples based on a down-conversion, from the first carrier frequency to a baseband frequency, of an aggregate data signal received from the plurality of source devices on the first carrier frequency in second overlapping time resources;
apply the weighting function to the baseband samples to generate weighted baseband samples;
generate, for transmission on a second carrier frequency to a destination device, an outgoing RF signal based on an up-conversion of the weighted baseband samples from the baseband frequency to the second carrier frequency.

Example 19: The relay device of example 18, wherein the relay device is further configured to determine the channel estimates based on a correlation operation between the aggregate control signal and a predetermined channel estimation sequence.

Example 20: The relay device of example 18, wherein the relay device is further configured to:
determine, based at least partly on a control signal received from the destination device on the second carrier frequency, channel estimates for a channel between the relay device and the destination device;
determine the weighting function further based at least partly on the channel estimates.

Example 21: The relay device of example 18, wherein the relay device operates in a group of distributed relay devices for relay of signals from the plurality of source devices to the destination device.

Example 22: A master device, configured to:
generate, for broadcast transmission, one or more pilot signals to enable training of one or more slave devices for aggregate transmissions, by the slave devices to a controller device; generate baseband samples based on a down-conversion, from a first carrier frequency to a baseband frequency, of an aggregate signal received from the slave devices,
wherein the aggregate signal includes a preamble portion based on a predetermined preamble sequence, and further includes a data portion;
determine an equalizer based on a comparison between the predetermined preamble sequence and the preamble portion of the aggregate signal; and
apply the equalizer to the data portion of the aggregate signal to generate equalized data samples.

Example 23: The master device of example 22, wherein the master device is part of a relay network for relay of a data signal from an originating device through one or more relay stages to a destination device.

Example 24: The master device of example 23, wherein when the master device operates as the destination device, the master device is configured to determine the equalizer based on a composite channel response between the originating device and the master device.

Example 25: The master device of example 22, wherein the aggregate signal is received on the first carrier frequency, the master device further configured to:
generate, for relay to a destination device on a second carrier frequency, an RF signal based on an up-conversion of the equalized data samples to the second carrier frequency.

Example 26: The master device of example 25, wherein the baseband samples are first baseband samples, the data portion is a first data portion, the RF signal is a first RF signal, the master device is further configured to:
generate second baseband samples based on the down-conversion, from the second carrier frequency to the baseband frequency, of a second RF signal from the destination device, wherein the second RF signal includes a second data portion to be relayed from the destination device to the slave devices; and
generate, for transmission to the slave devices on the first carrier frequency, a second RF signal based on an up-conversion of the second baseband samples to the second carrier frequency.

Example 27: The master device of example 22, wherein the master device further configured to generate the equalized data samples for relay to a destination device on an RF cable coupled to the master device.

Example 28: A communication system, the communication system comprising:
an intermediary communication device;
one or more hardware processors in communication with the intermediary communication device, the one or more hardware processors configured to:
determine, based at least partly on a control signal received at the intermediary communication device, channel estimates for a channel between the intermediary communication device and a first device;
determine, based at least partly on the channel estimates, a weighting function; generate baseband samples in a baseband frequency of one or more first signals, the one or more first signals received at the intermediary communication device from one or more second devices on a second carrier frequency different from the first carrier frequency;
apply the weighting function to the baseband samples to generate weighted baseband samples; and
generate one or more second signals for transmission to the first device on the first carrier frequency.

Example 29: The system of example 28, wherein the weighting function is based on a frequency-dependent phase or a frequency-dependent gain.

Example 30: The system of example 28, wherein the baseband samples are based on a down-conversion from the second carrier frequency to a baseband frequency.

Example 31: The system of example 28, wherein the second signal is based on an up-conversion of the weighted baseband samples from the baseband frequency to the first carrier frequency.

Example 32: The system of example 28, wherein the one or more hardware processors are configured to determine the channel estimates based on a correlation between the control signal and a predetermined channel estimation sequence.

Example 33: The system of example 28, wherein the one or more hardware processors are configured to: determine the channel estimates based on at least one of one or more information fields decoded from at least a portion of the control signal.

Example 34: The system of example 28, wherein the one or more first signals comprises an aggregate channel comprising RF signals from multiple second devices received in time resources that overlap.

Example 35: The system of example 34, wherein the channel estimates are first channel estimates, the time resources are first time resources, and the one or more hardware processors are configured to:
determine second channel estimates based on an aggregate control signal from the multiple second devices received in second time resources that overlap, and
determine the weighting function further based on the second channel estimates.

Example 36: The system of example 35, wherein the one or more hardware processors are configured to determine the weighting function based at least partly on complex conjugates of the second channel estimates.

Example 37: The system of example 34, wherein the baseband samples are first baseband samples, wherein the one or more hardware processors are further configured to:
generate second baseband samples of a third signal in the baseband frequency, the third signal received from the first device on the first carrier frequency; and
generate one or more fourth signals for transmission to multiple second devices on the second carrier frequency.

Example 38: The system of example 28, wherein the one or more first signals comprises at least a first RF signal from a first source device and a second RF signal from a second source device, the first and second RF signals received at the intermediary communication device in overlapping time resources.

Example 39: The system of example 28, wherein the one or more hardware processors are configured to apply the weighting function in the time domain.

Example 40: The system of example 39, wherein the one or more hardware processors are configured to apply the weighting function using an FIR filter.

Example 41: The system of example 28, wherein the one or more hardware processors are configured to apply the weighting function in the frequency domain.

Example 42: The system of example 28, wherein the one or more hardware processors are configured to determine the weighting function to enable transmit beamforming to the destination device.

Example 43: The system of example 28, wherein the intermediary communication device is part of a cluster of intermediary communication devices, the one or more hardware processors is configured to:
  receive, from the first device:
    an error signal that indicates a difference between: an aggregate channel of the intermediary communication devices received at the first device, and
    an expected signal received at the destination device; and
    determine the weighting function based at least partly on the error signal, to enable beamnulling at the first device.

Example 44: The system of example 28, wherein the weighting function includes a plurality of filter weights, and the one or more hardware processors is further configured to determine the weighting function based at least partly on one or more of the filter weights using an adaptive algorithm.

Example 45: The system of example 28, wherein the intermediary communication device operates in a group of distributed communication devices for relay of signals from the second devices to the first device.

Example 46: The system of example 28, wherein the intermediary communication device operates in a group of distributed communication devices for distributed relay of signals from the second devices to the first device, wherein the one or more hardware processors are further configured to determine the weighting function to enable distributed transmit beamforming to the first device.

Example 47: The system of example 28, wherein the one or more hardware processors are configured to generate the weighted baseband samples without decoding of the baseband samples.

Example 48: A intermediary communication device, the device configured to:
  receive a control signal from a destination device on a first carrier frequency;
  receive one or more first signals from one or more source devices on a second carrier frequency;
  generate, based at least partly on the control signal, weighted baseband samples of the one or more first signals in a baseband frequency without decoding of the baseband samples; and generate one or more second signals based on the weighted baseband samples for transmission to the destination device on the first carrier frequency.

Example 49: The intermediary communication device of example 48, wherein the first carrier frequency is different from the second carrier frequency.

Example 50: The intermediary communication device of example 48, wherein the intermediary communication device is configured to generate weighted baseband samples by: determining, based at least partly on the control signal, channel estimates for a channel between the intermediary communication device and the destination device and determining a weighting function based at least partly on the channel estimates.

Example 51: The intermediary communication device of example 50, wherein the weighting function is based on a frequency-dependent phase or a frequency-dependent gain.

Example 52: The intermediary communication device of example 48, wherein to generate the weighted baseband samples, the intermediary communication device is configured to generate baseband samples based on a down-conversion from the second carrier frequency to the baseband frequency.

Example 53: The intermediary communication device of example 48, wherein to generate the one or more second signals, the intermediary communication device is configured to generate one or more second signals based on an up-conversion from the baseband frequency to the first carrier frequency.

Example 54: A method of communicating information between communication devices, the method comprising:
  determining, based at least partly on a control signal received at an intermediary communication device, channel estimates for a channel between the intermediary communication device and a first device;
  determining, based at least partly on the channel estimates, a weighting function; generating baseband samples in a baseband frequency of one or more first signals, the one or more first signals received at the intermediary communication device from one or more second devices on a second carrier frequency different from the first carrier frequency;
  applying the weighting function to the baseband samples to generate weighted baseband samples; and
  generating one or more second signals for transmission to the first device on the first carrier frequency.

Example 55: The method of example 54, wherein the weighting function is based on a frequency-dependent phase or a frequency-dependent gain.

Example 56: The method of example 54, wherein the baseband samples are based on a down-conversion from the second carrier frequency to a baseband frequency, Example 57: The method of example 54, wherein the second signal is based on an up-conversion of the weighted baseband samples from the baseband frequency to the first carrier frequency.

Example 58: The method of example 54 comprising determining the channel estimates based on a correlation between the control signal and a predetermined channel estimation sequence.

Example 59: The method of example 54 comprising determining the channel estimates based on at least one of one or more information fields decoded from at least a portion of the control signal.

Example 60: The method of example 54, wherein the one or more first signals comprises an aggregate channel comprising RF signals from multiple second devices received in time resources that overlap.

Example 61: The method of example 60, wherein the channel estimates are first channel estimates, the time resources are first time resources, and the method comprises:
  determining second channel estimates based on an aggregate control signal from the multiple second devices received in second time resources that overlap, and
  determining the weighting function further based on the second channel estimates.

Example 62: The method of example 61 comprising determining the weighting function based at least partly on complex conjugates of the second channel estimates.

Example 63: The system of example 34, wherein the baseband samples are first baseband samples, wherein the method comprises:
  generating second baseband samples of a third signal in the baseband frequency, the third signal received from the first device on the first carrier frequency; and
  generating one or more fourth signals for transmission to multiple second devices on the second carrier frequency.

Example 64: The method of example 54, wherein the one or more first signals comprises at least an first RF signal from a first source device and a second RF signal from a second source device, the first and second RF signals received at the intermediary communication device in overlapping time resources.

Example 65: The method of example 54 comprising applying the weighting function in the time domain.

Example 66: The system of example 65 comprising applying the weighting function using an FIR filter.

Example 67: The method of example 54 comprising applying the weighting function in the frequency domain.

Example 68: The method of example 54, wherein the intermediary communication device is part of a cluster of intermediary communication devices, and wherein wherein the method comprises:
  receiving, from the first device:
    an error signal that indicates a difference between: an aggregate channel of the intermediary communication devices received at the first device, and
    an expected signal received at the destination device; and
    determining the weighting function based at least partly on the error signal, to enable beamnulling at the first device.

Example 69: The method of example 54, wherein the weighting function includes a plurality of filter weights, and the one or more hardware processors is further configured to determine the weighting function based at least partly on one or more of the filter weights using an adaptive algorithm.

Example 70: The method of example 54, wherein the intermediary communication device operates in a group of distributed communication devices for relay of signals from the second devices to the first device.

Example 71: The method of example 54, wherein the intermediary communication device operates in a group of distributed communication devices for distributed relay of signals from the second devices to the first device, wherein the method comprises determining the weighting function to enable distributed transmit beamforming to the first device.

Example 72: The method of example 54, wherein the method comprises generating the weighted baseband samples without decoding of the baseband samples.

I. Terminology

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics can be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

Embodiments of the disclosed systems and methods can be used and/or implemented with local and/or remote devices, components, and/or modules. The term "remote" may include devices, components, and/or modules not stored locally, for example, not accessible via a local bus. Thus, a remote device may include a device which is physically located in the same room and connected via a device such as a switch or a local area network. In other situations, a remote device may also be located in a separate geographic area, such as, for example, in a different location, building, city, country, and so forth.

Although described in the illustrative context of certain preferred embodiments and examples, it will be understood by those skilled in the art that the disclosure extends beyond the specifically described embodiments to other alternative embodiments and/or uses and obvious modifications and equivalents. Thus, it is intended that the scope of the claims which follow should not be limited by the particular embodiments described above.

What is claimed is:

1. A relay device, the relay device configured to:
  determine, based at least partly on a control signal received from a destination device on a first carrier frequency, channel estimates for a channel between the relay device and the destination device;
  determine, based at least partly on the channel estimates for the channel between the relay device and the destination device, a weighting function for transmissions from the relay device to the destination device, wherein the weighting function is based on a frequency-dependent phase or a frequency-dependent gain;
  generate baseband samples based on a down-conversion, from a second carrier frequency to a baseband frequency, of one or more incoming radio frequency (RF) signals received from one or more source devices on the second carrier frequency;
  apply the weighting function to the baseband samples to generate weighted baseband samples; and
  generate, for transmission on the first carrier frequency to the destination device, an outgoing RF signal based on an up-conversion of the weighted baseband samples from the baseband frequency to the first carrier frequency.

2. The relay device of claim 1, wherein the relay device is further configured to determine the channel estimates based on a correlation operation between the control signal and a predetermined channel estimation sequence.

3. The relay device of claim 1, wherein the relay device is further configured to: decode at least a portion of the control signal to generate one or more information fields; and
    determine the channel estimates based on at least one of the one or more information fields.

4. The relay device of claim 1, wherein the one or more incoming RF signals includes an aggregate channel comprising RF signals from multiple source devices received in time resources that overlap.

5. The relay device of claim 4, wherein the channel estimates are first channel estimates, the time resources are first time resources, and the relay device is further configured to:
    determine second channel estimates based on an aggregate control signal from the multiple source devices received in second time resources that overlap, and
    determine the weighting function further based on the second channel estimates.

6. The relay device of claim 5, wherein the relay device is further configured to determine the weighting function based at least partly on complex conjugates of the second channel estimates.

7. The relay device of claim 4, wherein the baseband samples are first baseband samples, wherein the relay device is further configured to:
    generate second baseband samples based on another down-conversion, from the first carrier frequency to the baseband frequency, of another RF signal received from the destination device on the first carrier frequency;
    generate, for transmission on the second carrier frequency to the multiple source devices, another outgoing RF signal based on another up-conversion of the second baseband samples from the baseband frequency to the second carrier frequency.

8. The relay device of claim 1, wherein the one or more incoming RF signals comprises at least a first RF signal from a first source device and a second RF signal from a second source device, the first and second RF signals received at the relay device in overlapping time resources.

9. The relay device of claim 1, wherein the relay device is configured to apply the weighting function in the time domain.

10. The relay device of claim 9, wherein the relay device is configured to apply the weighting function using an FIR filter.

11. The relay device of claim 1, wherein the relay device is configured to apply the weighting function in the frequency domain.

12. The relay device of claim 1, wherein the relay device is configured to determine the weighting function to enable transmit beamforming to the destination device.

13. The relay device of claim 1, wherein the relay device is part of a cluster of relay devices, the relay device is configured to:
    receive, from the destination device, an error signal that indicates a difference between: an aggregate channel of the relay devices received at the destination device, and an expected signal received at the destination device; and
    determine the weighting function based at least partly on the error signal, to enable beamnulling at the destination device.

14. The relay device of claim 1, wherein the weighting function includes a plurality of filter weights, and the relay device is further configured to determine the weighting function based at least partly on one or more of the filter weights using an adaptive algorithm.

15. The relay device of claim 1, wherein the relay device operates in a group of distributed relay devices for relay of signals from the source devices to the destination device.

16. The relay device of claim 1, wherein the relay device operates in a group of distributed relay devices for distributed relay of signals from the source devices to the destination device, wherein the relay device is further configured to determine the weighting function to enable distributed transmit beamforming to the destination device.

17. The relay device of claim 1, wherein the relay device is configurable to generate the weighted baseband samples without decoding of the baseband samples.

18. A communication system, the communication system comprising:
    an intermediary communication device;
    one or more hardware processors in communication with the intermediary communication device, the one or more hardware processors configured to:
        determine, based at least partly on a control signal received at the intermediary communication device, channel estimates for a channel between the intermediary communication device and a first device;
        determine, based at least partly on the channel estimates, a weighting function;
        generate baseband samples in a baseband frequency of one or more first signals, the one or more first signals received at the intermediary communication device from one or more second devices on a second carrier frequency different from a first carrier frequency;
        apply the weighting function to the baseband samples to generate weighted baseband samples; and
        generate, from the weighted baseband samples, one or more second signals for transmission to the first device on the first carrier frequency.

19. A method of communicating information between communication devices, the method comprising:
    determining, based at least partly on a control signal received at an intermediary communication device, channel estimates for a channel between the intermediary communication device and a first device;
    determining, based at least partly on the channel estimates, a weighting function;
    generating baseband samples in a baseband frequency of one or more first signals, the one or more first signals received at the intermediary communication device from one or more second devices on a second carrier frequency different from a first carrier frequency;
    applying the weighting function to the baseband samples to generate weighted baseband samples; and
    generating, from the weighted baseband samples, one or more second signals for transmission to the first device on the first carrier frequency.

* * * * *